(12) United States Patent
Singh

(10) Patent No.: US 11,650,874 B2
(45) Date of Patent: May 16, 2023

(54) ANOMALY DETECTION AND SELF-HEALING FOR ROBOTIC PROCESS AUTOMATION VIA ARTIFICIAL INTELLIGENCE / MACHINE LEARNING

(71) Applicant: UiPath, Inc., New York, NY (US)

(72) Inventor: Prabhdeep Singh, Bellevue, WA (US)

(73) Assignee: UiPath, Inc., New York, NY (US)

( * ) Notice: Subject to any disclaimer, the term of this patent is extended or adjusted under 35 U.S.C. 154(b) by 217 days.

(21) Appl. No.: 17/070,250

(22) Filed: Oct. 14, 2020

(65) Prior Publication Data

US 2022/0114044 A1    Apr. 14, 2022

(51) Int. Cl.
| | |
|---|---|
| *G06F 11/00* | (2006.01) |
| *G06F 11/07* | (2006.01) |
| *G06F 9/451* | (2018.01) |
| *G06N 20/00* | (2019.01) |
| *G06F 11/22* | (2006.01) |

(52) U.S. Cl.
CPC .......... *G06F 11/0793* (2013.01); *G06F 9/453* (2018.02); *G06F 11/079* (2013.01); *G06F 11/2263* (2013.01); *G06N 20/00* (2019.01)

(58) Field of Classification Search
CPC .... G06F 11/0793; G06F 11/079; G06F 9/453; G06F 11/2263; G06N 20/00
See application file for complete search history.

(56) References Cited

U.S. PATENT DOCUMENTS

| | | | | |
|---|---|---|---|---|
| 10,235,192 B2 * | 3/2019 | Hall | ..................... | G06F 11/0793 |
| 10,682,761 B2 * | 6/2020 | Geffen | ................... | B25J 9/1661 |
| 10,710,239 B2 * | 7/2020 | Safary | ..................... | G06F 11/00 |
| 10,789,157 B2 | 9/2020 | Jain et al. | | |
| 10,970,064 B1 * | 4/2021 | Anand | ................. | G06N 3/0445 |
| 2015/0199615 A1 * | 7/2015 | Amendjian | ........... | G06F 3/0481 706/11 |
| 2016/0335150 A1 * | 11/2016 | Amendjian | ......... | G06F 11/0775 |
| 2017/0228119 A1 * | 8/2017 | Hosbettu | ................ | G06Q 10/00 |
| 2018/0370029 A1 * | 12/2018 | Hall | ..................... | G06F 11/0715 |
| 2019/0155225 A1 * | 5/2019 | Kothandaraman | .. | G05B 13/041 |

(Continued)

FOREIGN PATENT DOCUMENTS

CN      111667163 A      9/2020

OTHER PUBLICATIONS

International Search Report & Written Opinion, dated Jan. 20, 2022, U.S. Patent Application No. PCT/US21/53504.

(Continued)

*Primary Examiner* — Philip Guyton
(74) *Attorney, Agent, or Firm* — LeonardPatel PC; Michael A. Leonard, II; Sheetal S. Patel

(57) ABSTRACT

Anomaly detection and self-healing for robotic process automation (RPA) via artificial intelligence (AI)/machine learning (ML) is disclosed. RPA robots that utilize AI/ML models and computer vision (CV) may interpret and/or interact with most encountered graphical elements via normal learned interactions. However, such RPA robots may occasionally encounter new, unhandled anomalies where graphical elements cannot be identified and/or normal interactions will not work. Such anomalies may be processed by an anomaly handler. The RPA robots may have self-healing functionality that seeks to automatically find information that addresses anomalies.

19 Claims, 7 Drawing Sheets

(56) References Cited

U.S. PATENT DOCUMENTS

| | | |
|---|---|---|
| 2019/0265990 A1 | 8/2019 | Hall et al. |
| 2020/0073686 A1 | 3/2020 | Hanke et al. |
| 2020/0226249 A1 | 7/2020 | Zhan et al. |
| 2020/0320432 A1 | 10/2020 | Chan et al. |
| 2021/0042126 A1* | 2/2021 | Perera ................. G06F 11/0772 |
| 2021/0303381 A1* | 9/2021 | Baldassarre ........ G06F 11/0751 |
| 2021/0326197 A1* | 10/2021 | Honnappa ............ G06F 11/0793 |
| 2022/0091923 A1* | 3/2022 | O'Toole .............. G06F 11/0772 |

OTHER PUBLICATIONS

Wilkinson, Jeff, "Why Self-Healing Test Automation is the Next Big Thing", accenture.com, Software Engineering Blog, Aug. 20, 2020, retrieved from https://www.acccenture.com/us-en/blogs/software-engineering-blog/wilkinson-self-healing-test-automation.

\* cited by examiner

ANOMALY DETECTION AND SELF-HEALING FOR ROBOTIC PROCESS AUTOMATION VIA ARTIFICIAL INTELLIGENCE / MACHINE LEARNING

FIELD

The present invention generally relates to user interface (UI) automation, and more specifically, to anomaly detection and self-healing for robotic process automation (RPA) via artificial intelligence (AI)/machine learning (ML).

BACKGROUND

Currently, when anomalies occur in RPA at runtime (e.g., in production environments), the source of the problem is analyzed, and RPA developers provide a programmatic solution based on the analysis. However, this process tends to be time consuming and expensive. Accordingly, an improved approach may be beneficial.

SUMMARY

Certain embodiments of the present invention may provide solutions to the problems and needs in the art that have not yet been fully identified, appreciated, or solved by current UI automation technologies. For example, some embodiments of the present invention pertain to anomaly detection and self-healing for RPA via AI/ML.

In an embodiment, a computer-implemented method includes executing an RPA workflow that performs a UI automation using an AI/ML model, by an RPA robot. The computer-implemented method also includes, using the AI/ML model, searching for a target graphical element in the UI to be interacted with by an activity of the RPA workflow, by the RPA robot. When the target graphical element is not uniquely found by the AI/ML model or cannot be interacted with, the computer-implemented method further includes automatically attempting to correct the anomaly, by the RPA robot or the AI/ML model.

In another embodiment, a non-transitory computer-readable medium stores a computer program. The computer program is configured to cause at least one processor to execute an RPA workflow that performs a UI automation using an AI/ML model. Using the AI/ML model, the computer program is also configured to cause at least one processor to search for a target graphical element in the UI to be interacted with by an activity of the RPA workflow. When the target graphical element is not uniquely found by the AI/ML model or cannot be interacted with, the computer program is further configured to cause at least one processor to automatically attempt to correct the anomaly.

In yet another embodiment, a computing system includes memory storing computer program instructions and at least one processor configured to execute the computer program instructions. The computer program instructions are configured to cause the at least on processor to execute an RPA workflow that performs a UI automation using an AI/ML model, by an RPA robot. Using the AI/ML model, the computer program instructions are also configured to cause the at least on processor to search for a target graphical element in the UI to be interacted with by an activity of the RPA workflow, by the RPA robot. When the target graphical element is not uniquely found by the AI/ML model or cannot be interacted with, the computer program instructions are further configured to cause the at least on processor to automatically attempt to correct the anomaly, by the RPA robot or the AI/ML model. The automatic attempt to correct the anomaly includes determining whether one or more features differentiate the target graphical element from other similar graphical elements, attempting a self-healing process to complete missing data without user input, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
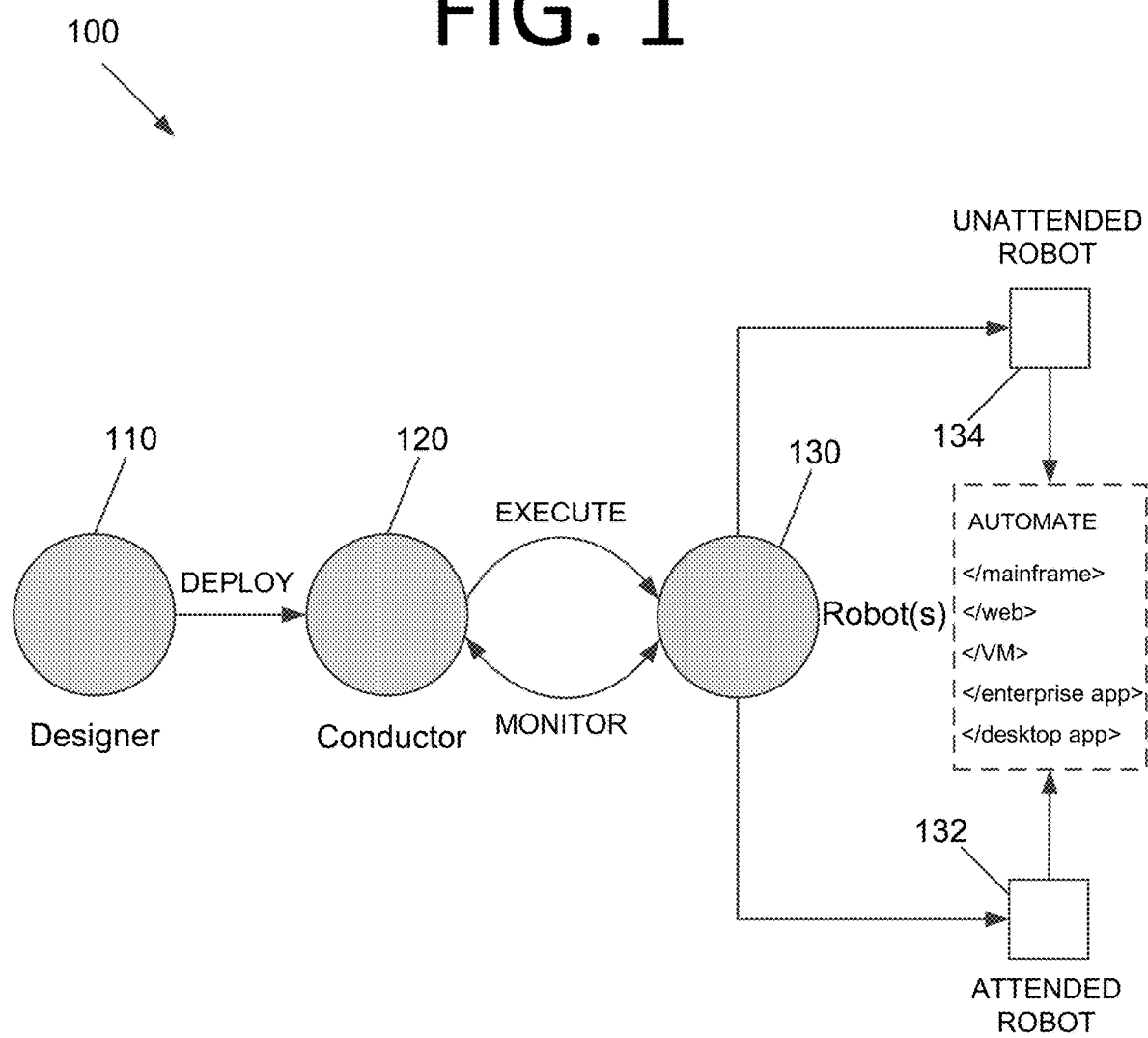
FIG. 1 is an architectural diagram illustrating a robotic process automation (RPA) system, according to an embodiment of the present invention.

Some embodiments pertain to anomaly detection and self-healing for RPA via AI/ML. RPA robots that utilize AI/ML models and computer vision (CV) may interpret and/or interact with most encountered graphical elements in a UI via normal learned interactions. However, such RPA robots may occasionally encounter new, unhandled anomalies where graphical elements cannot be identified and/or normal interactions will not work. Such anomalies may be processed by an anomaly handler of an RPA robot or an AI/ML model in some embodiments.

When an anomaly occurs, such as where multiple submit buttons appear on a screen and the AI/ML model cannot determine which button to click on its own, the anomaly handler may try to determine whether there is something that differentiates these graphical elements from one another. This may include, but is not limited to, looking at the graphical elements surrounding the target graphical element(s) within a certain radius, looking at the order of the graphical elements on the screen, trying to determine whether there is something that differentiates the target graphical element visually from other similar graphical elements, etc. In some embodiments, a default action may be taken, such as automatically selecting the graphical element appearing closest to the top or the bottom of the screen.

In some embodiments, the default action may be to search in a UI object library including UI objects or a UI object repository of UI object libraries for a UI descriptor that allows the RPA robot or AI/ML model to interact with the target graphical element. UI elements on the screen (e.g., text fields, buttons, labels, menus, checkboxes, etc.) can be grouped by applications, application versions, application screens, and collections of UI elements, and each screen has multiple UI elements. As used herein, a "screen" is an image of an application UI or a portion of the application UI at a certain point in time (e.g., a screenshot). For a running UI automation, the screen may be the current UI of a computing system. An "application" or a version of a given application may be a union of screens in this context or a running application at runtime. Each UI element may be described by one or more UI descriptors in some embodiments. The UI elements, UI descriptors, applications, and application screens are UI objects. In some embodiments, UI elements and screens may be further differentiated into specific types of UI elements (e.g., buttons, checkboxes, text fields, etc.) and screens (e.g., top windows, modal windows, popup windows, etc.).

The UI object libraries may be stored in a UI object repository in some embodiments. As used herein, the UI object repository is a collection of UI object libraries. In some embodiments, the UI object repository may be a NuGet™ feed, a web service, etc. The UI object repository of UI object libraries in some embodiments may facilitate the managing, reusing, and increasing the reliability of UI descriptors in a project. UI descriptors may be added to UI libraries and be published or republished for global reuse in a UI object repository in some embodiments.

To make UI objects reusable, they may be extracted into UI object libraries that can be referenced by RPA processes. When selectors or other UI descriptors are modified due to a new version of an application, for example, the UI object library may be recreated (or republished) to include the modified UI descriptors. RPA processes using the UI object library may then call the modified UI descriptor versions. References to the new application programming interface (API) associated with the new library may be modified for an RPA process manually by a developer, modified via a software tool (e.g., a tool that goes through an RPA process and updates UI descriptor references when selectors or other components thereof change), or modified automatically in some embodiments.

In some embodiments, packages of UI objects may be attached as a dependency (e.g., NuGet™ packages). However, in certain embodiments, the UI objects may be obtained via one or more API calls to a web service. This enables the UI objects to be stored remotely and retrieved and used during the automation.

UI elements added to UI object libraries may represent selectors for use in RPA workflows. To automate specific actions in the UI, the RPA robot may interact with various windows, buttons, drop-down lists, and/or other graphical elements. Conventionally, this is done using the expected screen positions of UI elements. However, this is not dependable.

Some embodiments use selectors that overcome the problems associated with fixed coordinate identification by storing the attributes of a UI element and its parents in an XML fragment. While selectors may be automatically generated in some embodiments where the UI is static, some software programs, such as some web applications, have changing layouts and attribute nodes with volatile values. These changes may not be readily predictable, and this previously required manual generation of some selectors. However, some embodiments may overcome this issue by using other types of UI descriptors, for example.

Selectors are a type of UI descriptor that may be used to detect UI elements in some embodiments. A selector has the following structure in some embodiments:

<node_1/><node_2/> . . . <node_N/>

The last node represents the GUI element of interest, and all previous nodes represent the parents of that element. <node_1> is usually referred to as a root node and represents the top window of the application.

Each node may have one or more attributes that assist with correct identification of a specific level of the selected application. Each node has the following format in some embodiments:

<ui_system attr_name_1='attr_value_1' . . . attr_name_N='attr_value_N'/>

Every attribute may have an assigned value, and attributes with constant values may be selected. This is because changes to the value of an attribute each time the application is started may lead to the selector not being able to correctly identify the associated element.

UI object library descriptors may be added directly to an RPA workflow activity, saving developer time that may otherwise be required to create a custom selector for the activity. An object library is defined herein as a collection of UI descriptors corresponding to one or more screens from a certain version of an application. A UI descriptor is a set of instructions for finding a UI element. UI descriptors in some embodiments are an encapsulated data/struct format that includes UI element selector(s), anchor selector(s), computer vision (CV) descriptor(s), unified target descriptor(s), a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention. A unified target descriptor chains together multiple types of UI descriptors. A unified target descriptor may function like a finite state machine (FSM), where in a first context, a first UI descriptor mechanism is applied, in a second context, a second UI descriptor is applied, etc.

Conventionally, making a selector reliable requires testing, understanding of intrinsic selector details, etc. This renders creating/refining selectors difficult or impossible for individuals without technical knowledge. By providing a library of working selectors for common UI elements and tasks, some embodiments allow development of automations that work in production by non-technical individuals. A user may indicate a screen of a version of an application to automate, and the RPA development application may fetch that screen. The user may then interact with the screen to define what he or she would like to do.

In some embodiments, as new UI descriptors are created and/or existing UI descriptors are modified, a global database of UI object libraries may be built that is sharable, collaborative, and potentially open source. In certain embodiments, taxonomies and ontologies may be used.

Applications, versions, screens, UI elements, descriptors, etc. may be defined as a taxonomy, which is a hierarchical structure of subcategories.

However, many real-world concepts do not readily lend themselves to taxonomical organization. Rather, they may be closer to the concept of a mathematical ontology. In an ontology, the relationships between categories are not necessarily hierarchical. For instance, the case where a button on the screen takes the user to another screen when clicked cannot be readily capture by a taxonomy of that screen since the next screen is not in the hierarchy. In some embodiments, interactions between UI elements on the same screen or different screens may be accommodated and information on how UI elements relate to one another, potentially on different screens, may be provided.

Consider the example where clicking an OK button leads to an employee screen. An ontological structure may cause the designer application to suggest that the user filter employees on the next screen. The ontological information of the relation between these screens via the OK button allows the designer application to do this. By defining a graphical structure that is not necessarily a tree, but rather, relates to what the application is actually doing, more complex and rich relationships can be captured.

UI descriptors may be extracted from activities in an RPA workflow and added to a structured schema that groups the UI descriptors by UI applications, screens, and UI elements. UI descriptors may be part of one project for wide reuse, part of global repositories for testing purposes, or part of UI object libraries for global cross-project sharing in some embodiments. An object library in some embodiments is an encapsulation of UI descriptors grouped by applications, application versions, and screens. UI descriptors can be defined and added to the object library, which can be installed in other projects as dependencies after publishing in some embodiments. This makes the object library of UI descriptors available for reuse. A UI application in some embodiments is a targeted application that has multiple versions where each version has multiple screens.

The UI object repository and UI descriptor reuse may be beneficial for a variety of reasons. For instance, if the location, appearance, and/or functionality of a UI element in an application changes, the UI descriptor may be changed, and the change may then be propagated to activities using the UI descriptor. Thus, reusability may be provided at the level of identifying graphical elements in a UI.

This may be especially beneficial for accommodating new versions of applications. For a new version, a software developer may only need to update UI descriptors and/or develop a few new selectors from scratch, substantially reducing development time. For a webpage, for instance, HyperText Markup Language (HTML) may be inspected to obtain paths to UI elements for the corresponding selectors. Selectors for corresponding UI elements may be different in different web browsers and/or different versions of the same web browser. This concept may also apply to visual desktop, server, smart phone, and tablet applications. UI object libraries may contain the actual selectors for the application, which is just one type of UI descriptor, per the above. A UI object library may have multiple UI descriptors of different types for one or more applications. UI descriptors may also refer to different technologies with which the application is built. For instance, different UI descriptors may be created and used for standalone desktop, web, and mobile applications. For one technology, you may want to use selectors, for another, you may want to use CV descriptors, etc.

The UI descriptors may work with a unified target that encompasses all UI detection mechanisms through which image detection and definition are performed in some embodiments. The unified target may merge multiple techniques of identifying and automating UI elements into a single cohesive approach. The unified target may prioritize selector-based and driver-based UI detection mechanisms and fallback on CV to find an image if the first two mechanisms are not successful. A selector editor and UI explorer may be configured to support the unified target in some embodiments.

An example of an object library structure is provided below.

SAP
   version 1
      screen 1
         object 1
         object 2
         . . .
      screen 2 . . .
      . . .
   version 2 . . .
   . . .
Salesforce
. . .

It should be noted that the hierarchy above is provided by way of example only. Any desired number of levels in the hierarchy and elements associated with each level may be used without deviating from the scope of the invention. In certain embodiments, the user can define the application map as he or she desires. Moreover, some nodes in the tree may only serve a management role and not a functional one in some embodiments. For instance, UI elements may be grouped together into a container that does not have UI descriptors. The container may exist for the purpose of grouping only in some embodiments.

In order to make use of UI object libraries and/or a UI object repository, when a target graphical element cannot be identified, the RPA robot or AI/ML model of some embodiments defaults to searching a UI object library or a repository of UI object libraries for UI descriptors that may be able to interact with the target graphical element. For instance, the RPA robot or AI/ML model may look for UI descriptor with the same name, with the same or similar attributes, with the same target application but a different version, etc. If such UI descriptor(s) are found, they may automatically be tried by the RPA robot or the AI/ML model. If successful in interacting with the target graphical element, the RPA robot or AI/ML model may be modified to use the successful UI descriptor in the future in addition to or in lieu of the UI descriptor that was previously tried. The UI object library or UI object repository may be local or remote to the RPA robot or the AI/ML model that searches them.

Where the target graphical element still cannot be identified by the anomaly handler and/or the default action fails, the RPA robot may handle exceptions gracefully. For instance, if the target graphical element is not required to complete the overall task with a sufficient degree of accuracy, the anomaly handler may cause the RPA robot to continue execution of its workflow, prompt the user regarding whether to proceed, ask for labeled training data to be used to address the anomaly in the future, etc. Such anomaly handling may make AI/ML models more robust to real world differences and changes at runtime. This may occur when a new version of an application is released, different browser settings are encountered, etc.

In some embodiments, self-healing capabilities may be provided such that the RPA robot and/or AI/ML model attempt to complete missing data from anomalies without user input. RPA developers may make certain inputs to the AI/ML model variables, pull the data from a database, etc. In some embodiments, AI tools may be used to generate this code without human design time.

Self-healing can employ various techniques in some embodiments. For document understanding or other applications, for example, if human validation is frequently required, it can be inferred that the AI/ML model is not good enough. The AI/ML model may employ various techniques to attempt to improve its own performance as a "self-healing" measure. For instance, the AI/ML model may try a different optical character recognition (OCR) engine, modify the properties of the image (e.g., brightness, hue, contrast, convert to grayscale, etc.), search for images that appear similar and check the technique(s) and/or results that were applied for those images, etc. The AI/ML model may monitor whether the human validation effort decreases, speed and/or efficiency of execution increases (e.g., the process runs faster and/or steps in an RPA workflow can be sped up or eliminated), or the return on investment (ROI) improves to determine whether the self-healing efforts of the AI/ML model are working. If not, the AI/ML model may try different techniques and/or use different information. The AI/ML model may then learn how to complete missing, incorrect, and/or incomplete data at runtime based on this self-healing approach.

In some embodiments, reinforcement learning may be used. In reinforcement learning, there is an exploration phase and an exploitation phase. In the exploration phase, the system may attempt to randomly find the solution from the start state to the end state using a reward function that explores intermediate transitions and steps with both short term and long term rewards to guide the search of the state space. For example, in the case where the anomaly is that a target graphical element could not be found in a UI or the interaction therewith failed, the winning state may be the correct interaction with the target graphical element that the activity in the RPA workflow should achieve. If a solution is found, the RPA robot or the AI/ML model may be modified to attempt this solution in addition to or in lieu of the previous approach.

Rather than performing completely random exploration, some embodiments determine what the policy should be via the policy network. This may drastically reduce the number of simulations required to achieve a winning state, which enables AI/ML models trained via reinforcement learning to be developed and deployed more quickly, to be trained using fewer computing hardware resources, or both. Indeed, in some embodiments, reinforcement learning may be performed on a user's own computing system, such as a desktop computer, a laptop computer, a smart phone, etc., which is typically not possible conventionally.

In the context of interacting with a user interface, for example, a robot may randomly click on a screen to determine what is clickable. Reinforcement learning may then be used to move a desired automation ahead. For instance, given a spreadsheet of email addresses and desired email text, reinforcement learning may be used to discover which clickable button opens an email application, discover where different text should be entered in the email, and discover the button to click to send the email. In this example, the policy network may be used to first determine whether sending an email is even possible or desired. Once this determination is made, the policy network may then determine whether the email addresses from the spreadsheet and the email body text can be copied into the email before sending.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
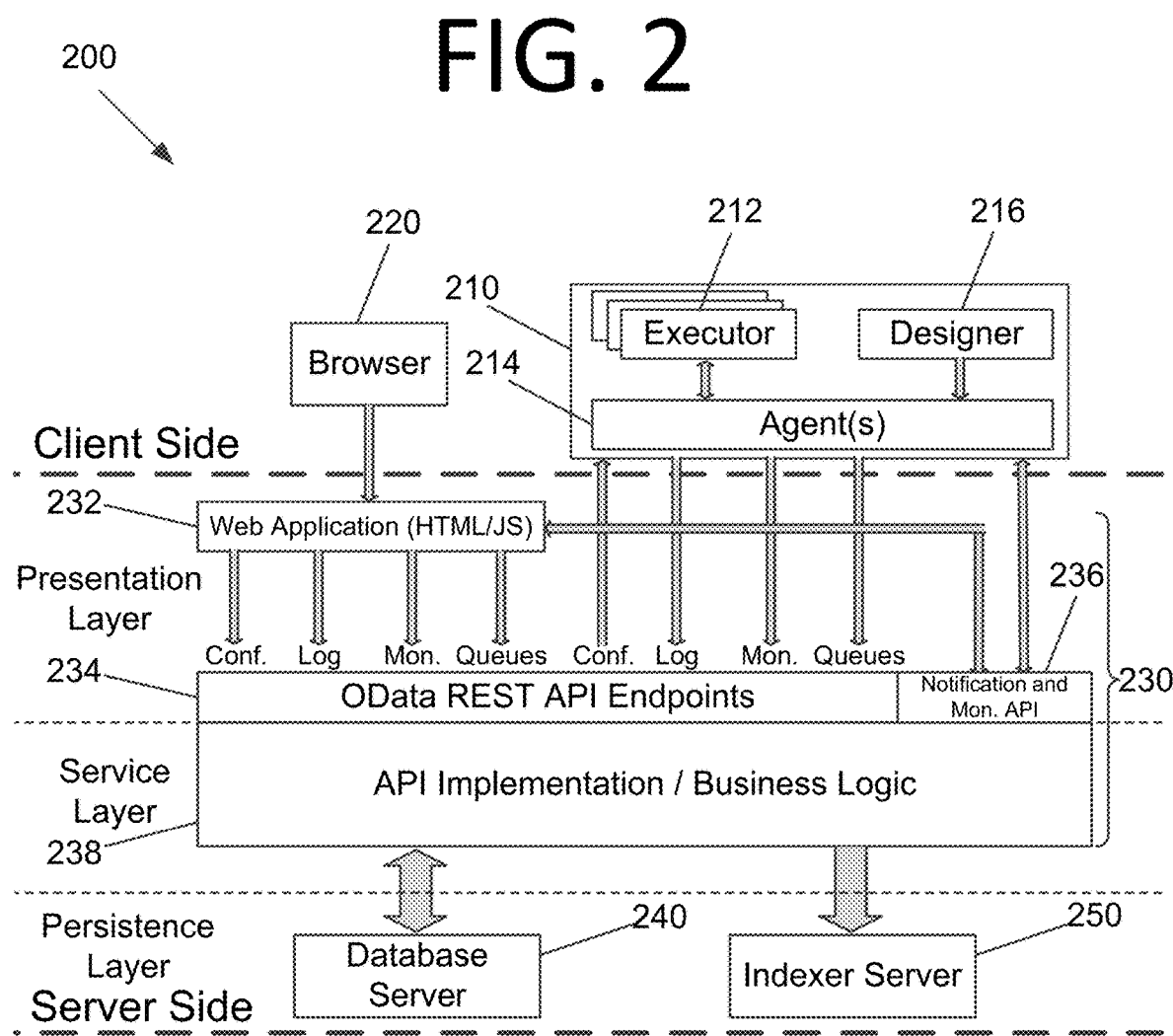
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint (s) to indexer server 250, where they are indexed for future utilization.

Figure 3:
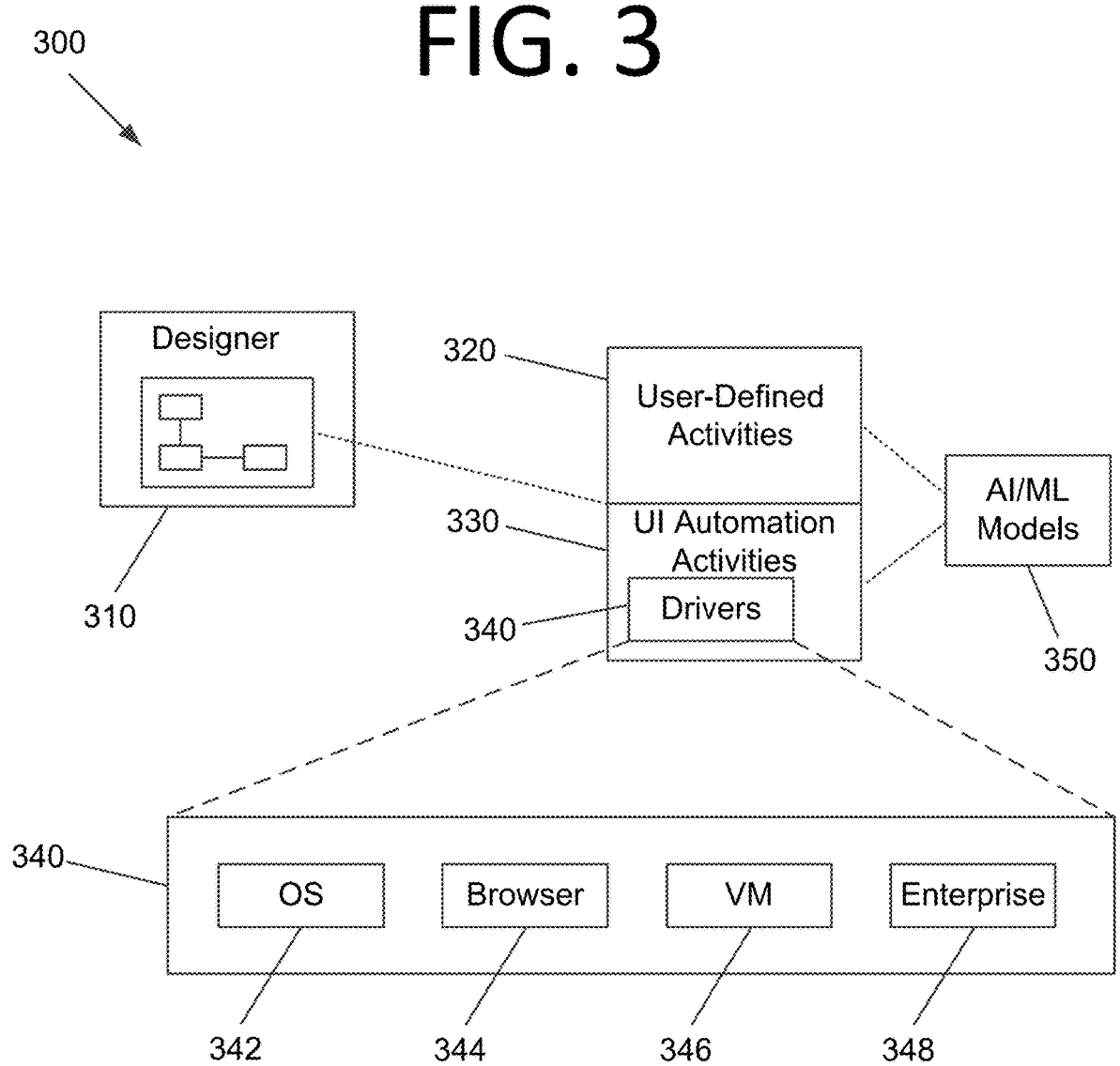
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
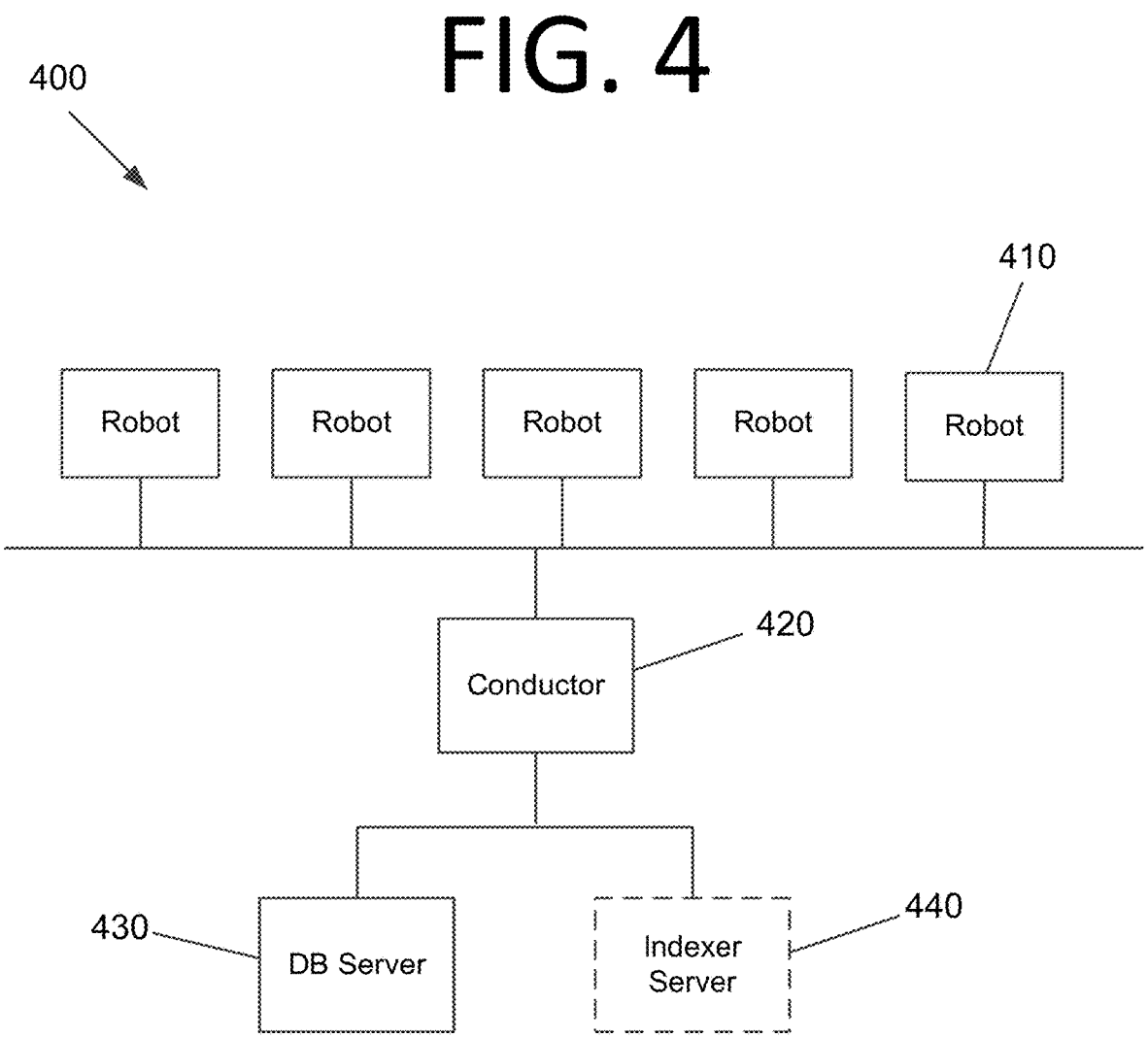
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
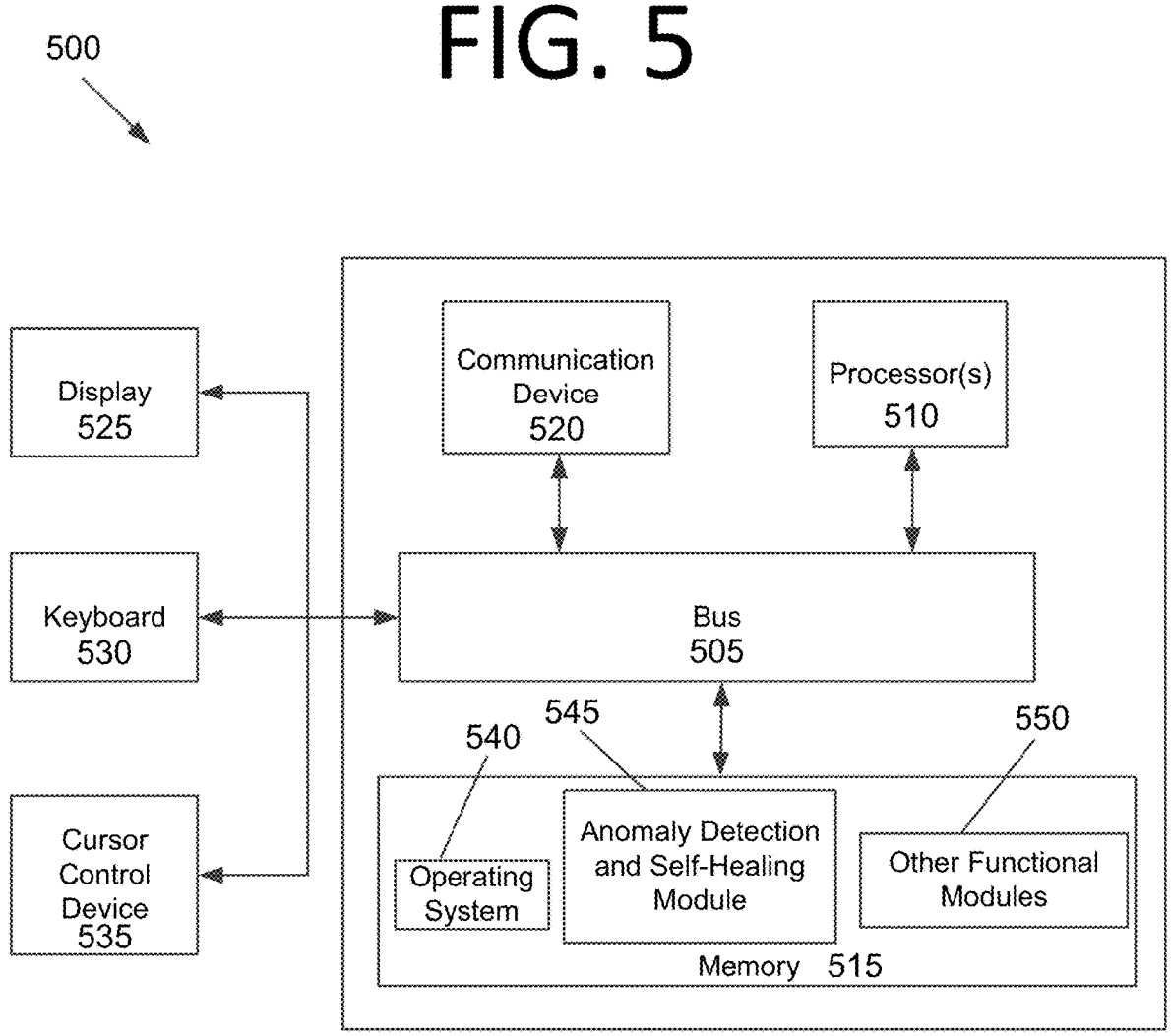
FIG. 5 is an architectural diagram illustrating a computing system configured to perform anomaly detection and self-healing for RPA via AI/ML, according to an embodiment of the present invention.

FIG. 5 is an architectural diagram illustrating a computing system 500 configured to perform anomaly detection and self-healing for RPA via AI/ML, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include anomaly detection and self-healing module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
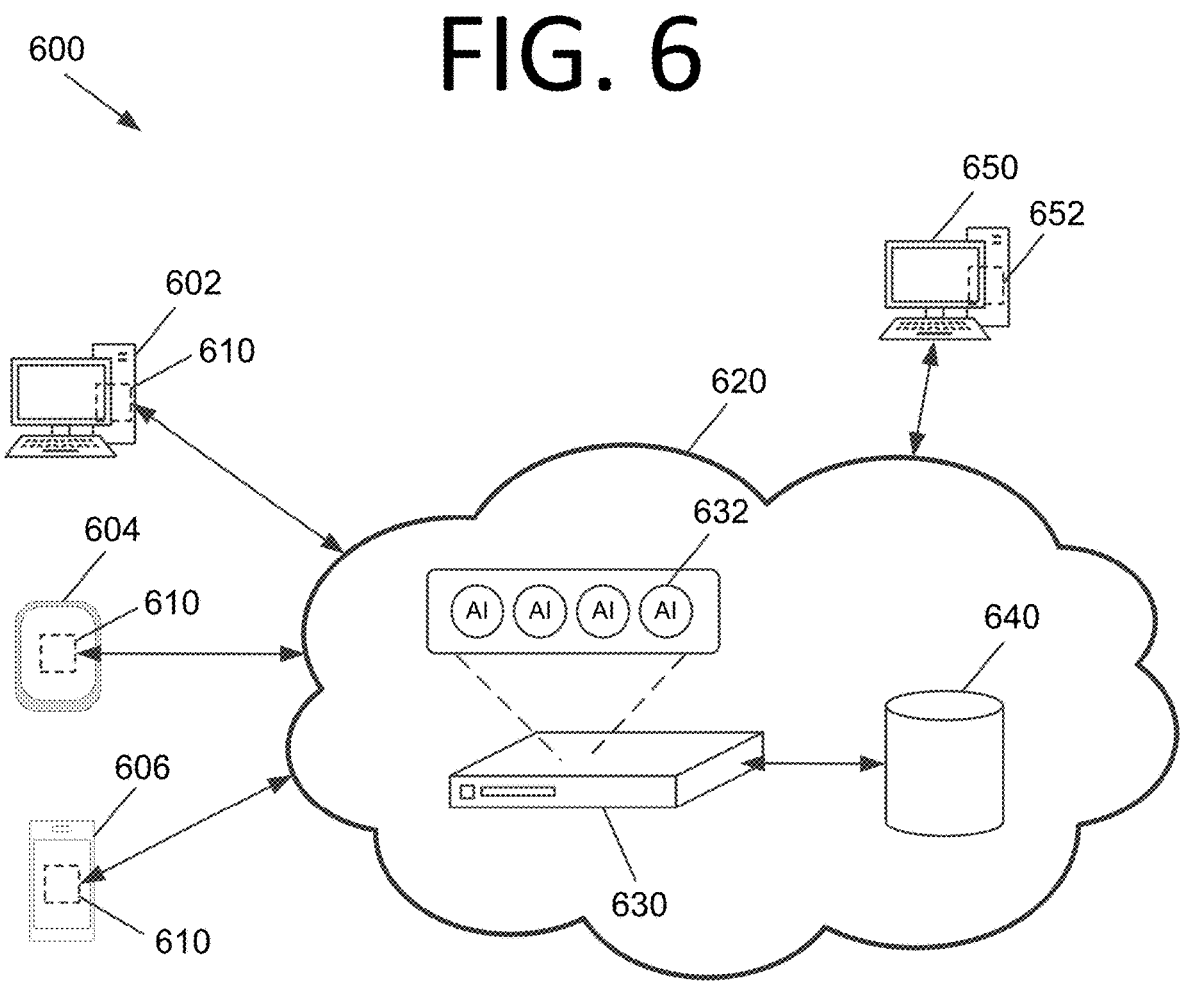
FIG. 6 is an architectural diagram illustrating a system configured to perform anomaly detection and self-healing for RPA via AI/ML, according to an embodiment of the present invention.

FIG. 6 is an architectural diagram illustrating a system 600 configured to perform anomaly detection and self-healing for RPA via AI/ML, according to an embodiment of the present invention. System 600 includes user computing systems, such as desktop computers 602, 603, tablet 604, and smart phone 606. However, any desired computing system may be used without deviating from the scope of invention including, but not limited to, smart watches, laptop computers, etc. Also, while three user computing systems are shown in FIG. 6, any suitable number of computing systems may be used without deviating from the scope of the invention. For instance, in some embodiments, dozens, hundreds, thousands, or millions of computing systems may be used.

Each computing system 602, 604, 606 has an AI/ML-enabled RPA robot 610 that uses AI/ML models, such as AI/ML models 632, to perform certain tasks. For example, RPA robots 610 may use AI/ML models that are trained to use CV to recognize what the user is doing on the respective computing system. Computing systems 602, 604, 606 send information via a network 620 (e.g., a local area network (LAN), a mobile communications network, a satellite communications network, the Internet, any combination thereof, etc.) to a server 630. In some embodiments, server 630 may be part of a public cloud architecture, a private cloud architecture, a hybrid cloud architecture, etc. In certain embodiments, server 630 may host multiple software-based servers on a single computing system 630. Server 630 includes AI/ML models 632 in this embodiment that are called by RPA robots 610 to perform operations.

RPA robots 610 include anomaly handling and/or self-healing logic that attempts to detect and correct anomalies automatically. This logic may be incorporated into RPA robots 610 themselves, AI/ML models 632, or a combination thereof. Including the anomaly handling and/or self-healing logic as part of AI/ML models 632 may allow information from multiple or many computing systems to be utilized, potentially providing more samples, examples of how users overcame issues, etc.

RPA robots 610 may occasionally encounter new, unhandled anomalies where graphical elements cannot be identified and/or normal interactions will not work. Such anomalies may be processed by the anomaly handler (e.g., a subset of activities in the workflow(s) of RPA robots 610 or logic within AI/ML models 632), which tries to handle the anomaly automatically. Where the target graphical element still cannot be identified by the anomaly handler, RPA robots 610 may handle exceptions. RPA robots 610 and/or AI/ML models 632 may have self-healing functionality that attempts to complete missing data from anomalies without user input in some embodiments.

In some embodiments, data pertaining to anomalies may be stored in a database 640 for review by an application 652 of a training computing system 650 that allows a user to label screens pertaining to anomalies that could not be handled and/or correct attempts at self-healing by RPA robots 610. For example, the user could be prompted for guidance if a scenario arises that has not previously been seen, such as a new control that is not recognized by the AI/ML model. The user may then label the control on the screen, and potentially provide an action to take if the control works differently than the previous control that the AI/ML model was trained to recognize. Using this training data, AI/ML models 632 may be retrained to increase accuracy. In some embodiments, the AI/ML models called by RPA robots 610 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to identify sequences of user interactions.

AI Layers

In some embodiments, multiple AI layers may be used. Each AI layer is an algorithm (or model) that runs on the data, and the AI model itself may be deep learning neural networks (DLNNs) of trained artificial "neurons" that are trained in training data. Layers may be run in series, in parallel, or a combination thereof.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in the screens. For example, one AI layer could perform OCR, another could detect buttons, another could compare sequences, etc. Patterns may be determined individually by an AI layer or collectively by multiple AI layers.

Figure 7:
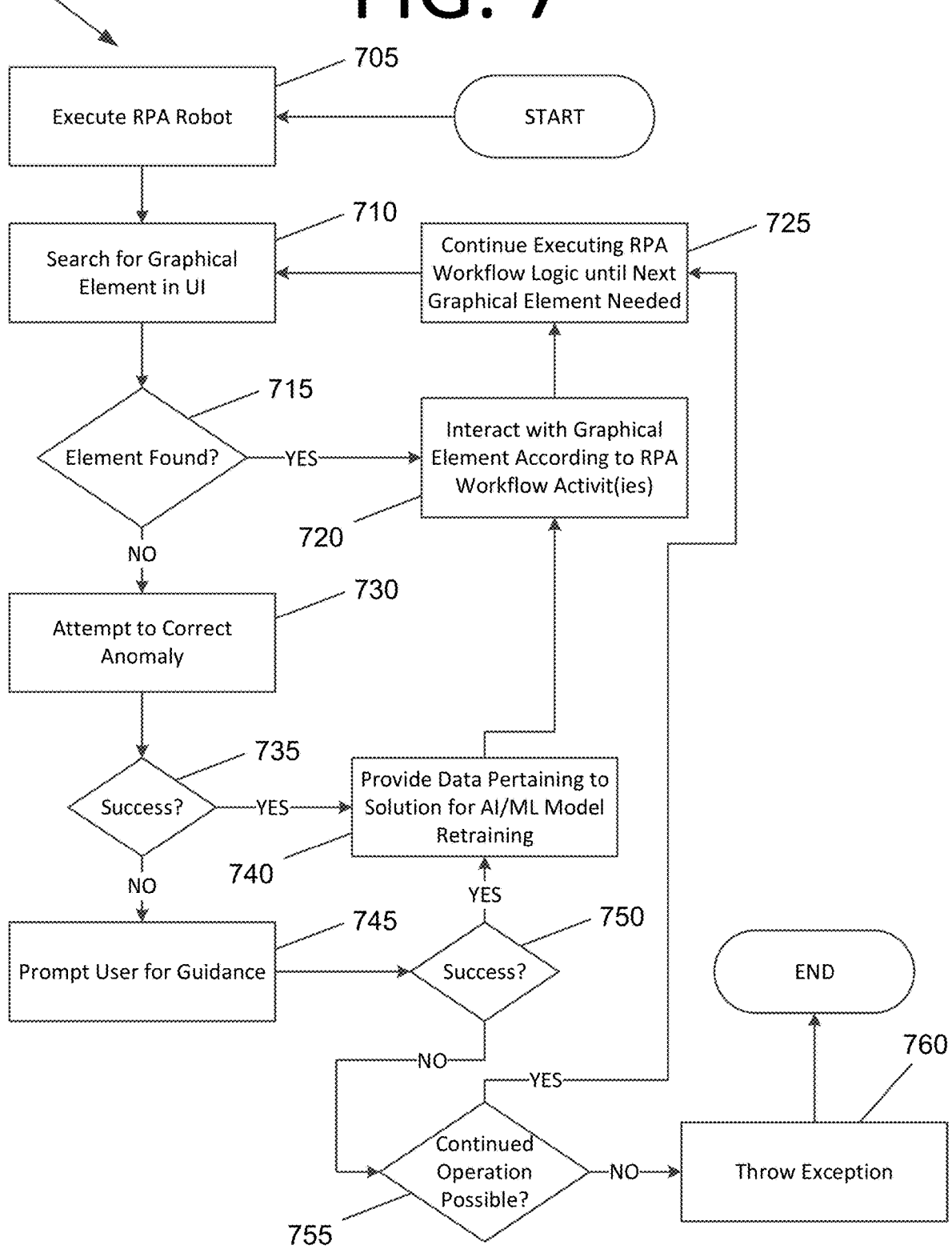
FIG. 7 is a flowchart illustrating a process for performing anomaly detection and self-healing for RPA via AI/ML, according to an embodiment of the present invention.

FIG. 7 is a flowchart illustrating a process 700 for performing anomaly detection and self-healing for RPA via AI/ML, according to an embodiment of the present invention. The process begins with executing an RPA robot (and thus, an RPA workflow) that performs a UI automation using an AI/ML model at 705. Using the AI/ML model, the RPA robot searches for a target graphical element in the UI to be interacted with by an activity of the RPA workflow at 710. When the target graphical element is uniquely found by the AI/ML model at 715, the RPA robot interacts with the target graphical element according to one or more RPA activities in the RPA workflow at 720. The RPA robot then continues executing the RPA workflow logic at 725 until an interaction with a next graphical element is needed. The process then returns to step 710.

However, when the target graphical element is not uniquely found by the AI/ML model or cannot be interacted with at 715, the RPA robot or the AI/ML model automatically attempts to correct the anomaly at 730. In some embodiments, the automatic attempt to correct the anomaly includes determining whether one or more features differentiate the target graphical element from other similar graphical elements. In certain embodiments, the determining of whether the one or more features differentiate the target graphical element from the other similar graphical elements includes analyzing graphical elements surrounding the target graphical element within a radius, utilizing an order of the graphical elements in the UI, determining whether the target graphical element has one or more different visual characteristics, or a combination thereof. In some embodiments, the automatic attempt to correct the anomaly includes changing visual characteristics of the UI and searching for the target graphical element in the UI using the changed visual characteristics. In certain embodiments, the automatic attempt to correct the anomaly comprises taking a default action. In some embodiments, the default action may be or include searching a UI object library or a UI object repository for one or more UI descriptors that enable the desired interaction with the target graphical element.

In some embodiments, the automatic attempt to correct the anomaly includes attempting a self-healing process to complete missing data without user input, by the RPA robot or the AI/ML model. This may be accomplished via an exploration phase in reinforcement learning, for example. In certain embodiments, the RPA robot or the AI/ML model is configured to determine whether the self-healing process was successful by monitoring whether one or more performance metrics improve responsive to the self-healing process. In some embodiments, when the self-healing process was not successful, the automatic attempt to correct the anomaly includes attempting one or more different techniques and monitoring whether the one or more different techniques improve the one or more performance metrics. In certain embodiments, the self-healing process includes polling a plurality of users to provide proposed solutions to the anomaly and selecting a most optimal solution of the proposed solutions based on one or more performance metrics. For instance, the most optimal solution may be selected based on speed, increased revenue, creation of more customer accounts, a combination thereof, etc.

When the automatic attempt to correct the anomaly is successful at 735, data pertaining to the automatic correction is provided (e.g., sent to a remote server and database such as server 630 and database 640 of FIG. 6) for subsequent retraining of the AI/ML model at 740, and the process proceeds to step 720 and continues as discussed above. However, when the automatic attempt to correct the anomaly is not successful, a user is prompted for a solution to identify the target graphical element, how to interact with the target graphical element, or both, at 745. For example, the user could be prompted for guidance if a scenario arises that has not previously been seen, such as a new control that is not recognized by the AI/ML model. The user may then label the control on the screen, and potentially provide an action to take if the control works differently than the previous control that the AI/ML model was trained to recognize. When the guidance provided by the user is successful in enabling the RPA robot to interact with the target graphical element, data pertaining to the user solution for subsequent retraining of the AI/ML model at 740, and the process proceeds to step 720 and continues as discussed above.

When the guidance provided by the user is not successful in enabling the RPA robot to interact with the target graphical element at 750, and the target graphical element is not necessary to complete an overall task of the RPA workflow and continued operation is possible at 755, the RPA robot may continue execution of the RPA workflow at 725. This may be possible, for instance, if the target graphical element is not required to complete the overall task with a sufficient degree of accuracy. However, when continued operation is not possible at 755, an exception is thrown at 760 and the process ends.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
executing a robotic process automation (RPA) workflow that performs a user interface (UI) automation using an artificial intelligence (AI)/machine learning (ML) model, by an RPA robot;
using the AI/ML model, searching for a target graphical element in the UI to be interacted with by an activity of the RPA workflow, by the RPA robot; and
when the target graphical element is not uniquely found by the AI/ML model or cannot be interacted with, constituting an anomaly for operation of the RPA robot, automatically attempting to correct the anomaly, by the RPA robot or the AI/ML model, wherein
the automatic attempt to correct the anomaly comprises determining whether one or more features differentiate the target graphical element from other similar graphical elements, analyzing graphical elements surrounding the target graphical element within a radius, utilizing an order of the graphical elements in the UI, determining whether the target graphical element has one or more different visual characteristics, changing visual characteristics of the UI and searching for the target graphical element in the UI using the changed visual characteristics, or any combination thereof.

2. The computer-implemented method of claim 1, wherein the automatic attempt to correct the anomaly comprises changing visual characteristics of the UI and searching for the target graphical element in the UI using the changed visual characteristics.

3. The computer-implemented method of claim 1, the automatic attempt to correct the anomaly comprises taking a default action.

4. The computer-implemented method of claim 3, wherein the default action comprises searching a UI object library or a UI object repository for one or more UI descriptors that enable interaction with the target graphical element.

5. The computer-implemented method of claim 1, wherein when the automatic attempt to correct the anomaly is successful, the method further comprises:
providing data pertaining to the automatic correction for subsequent retraining of the AI/ML model, by the RPA robot.

6. The computer-implemented method of claim 1, wherein when the automatic attempt to correct the anomaly is not successful, the method further comprises:
prompting a user for a solution to identify the target graphical element, how to interact with the target graphical element, or both, by the RPA robot.

7. The computer-implemented method of claim 6, wherein when the guidance provided by the user is successful in enabling the RPA robot to interact with the target graphical element, the method further comprises:
providing data pertaining to the user solution for subsequent retraining of the AI/ML model, by the RPA robot.

8. The computer-implemented method of claim 6, wherein when the guidance provided by the user is not successful in enabling the RPA robot to interact with the target graphical element and the target graphical element is not necessary to complete an overall task of the RPA workflow, the method further comprises:
attempting to continue execution of the RPA workflow, by the RPA robot.

9. The computer-implemented method of claim 1, wherein the automatic attempt to correct the anomaly comprises:
attempting a self-healing process to complete missing data without user input, by the RPA robot or the AI/ML model.

10. The computer-implemented method of claim 9, wherein the RPA robot or the AI/ML model is configured to determine whether the self-healing process was successful by monitoring whether one or more performance metrics improve responsive to the self-healing process.

11. The computer-implemented method of claim 9, wherein when the self-healing process was not successful, the method further comprises:
attempting one or more different techniques and monitoring whether the one or more different techniques improve the one or more performance metrics.

12. The computer-implemented method of claim 9, wherein the self-healing process comprises:
polling a plurality of users to provide proposed solutions to the anomaly; and
selecting a most optimal solution of the proposed solutions based on one or more performance metrics.

13. The computer-implemented method of claim 9, wherein the attempting of the self-healing process to complete the missing data without user input comprises using an exploration phase in reinforcement learning.

14. A non-transitory computer-readable medium storing a computer program, the computer program configured to cause at least one processor to:
execute a robotic process automation (RPA) workflow that performs a user interface (UI) automation using an artificial intelligence (AI)/machine learning (ML) model;
using the AI/ML model, search for a target graphical element in the UI to be interacted with by an activity of the RPA workflow; and
when the target graphical element is not uniquely found by the AI/ML model or cannot be interacted with, constituting an anomaly for operation of the RPA robot, automatically attempt to correct the anomaly, wherein
the automatic attempt to correct the anomaly comprises determining whether one or more features differentiate the target graphical element from other similar graphical elements, analyzing graphical elements surrounding the target graphical element within a radius, utilizing an order of the graphical elements in the UI, determining whether the target graphical element has one or more different visual characteristics, changing visual characteristics of the UI and searching for the target graphical element in the UI using the changed visual characteristics, or any combination thereof.

15. The non-transitory computer-readable medium of claim 14, wherein when the automatic attempt to correct the anomaly is successful, the computer program is further configured to cause the at least one processor to provide data pertaining to the automatic correction for subsequent retraining of the AI/ML model, and when the automatic attempt to correct the anomaly is not successful, the computer program is further configured to cause the at least one processor to prompt a user for a solution to identify the target graphical element, how to interact with the target graphical element, or both.

16. The non-transitory computer-readable medium of claim 15, wherein when the guidance provided by the user is successful in enabling the computer program to interact with the target graphical element, the computer program is further configured to cause the at least one processor to provide data pertaining to the user solution for subsequent retraining of the AI/ML model, and when the guidance provided by the user is not successful in enabling the computer program to interact with the target graphical element and the target graphical element is not necessary to complete an overall task of the RPA workflow, the computer program is further configured to cause the at least one processor to attempt to continue execution of the RPA workflow.

17. The non-transitory computer-readable medium of claim 14, wherein the automatic attempt to correct the anomaly comprises attempting a self-healing process to complete missing data without user input.

18. A computing system, comprising:

memory storing computer program instructions; and at least one processor configured to execute the computer program instructions, wherein the computer program instructions are configured to cause the at least on processor to:

execute a robotic process automation (RPA) workflow that performs a user interface (UI) automation using an artificial intelligence (AI)/machine learning (ML) model, by an RPA robot;

using the AI/ML model, search for a target graphical element in the UI to be interacted with by an activity of the RPA workflow, by the RPA robot; and when the target graphical element is not uniquely found by the AI/ML model or cannot be interacted with, constituting an anomaly for operation of the RPA robot, automatically attempt to correct the anomaly, by the RPA robot or the AI/ML model, wherein the automatic attempt to correct the anomaly comprises determining whether one or more features differentiate the target graphical element from other similar graphical elements, attempting a self-healing process to complete missing data without user input, or both.

19. The computing system of claim 18, wherein the determining of whether the one or more features differentiate the target graphical element from the other similar graphical elements comprises analyzing graphical elements surrounding the target graphical element within a radius, utilizing an order of the graphical elements in the UI, determining whether the target graphical element has one or more different visual characteristics, or a combination thereof.

* * * * *